United States Patent [19]
Porath et al.

[11] 3,925,152
[45] Dec. 9, 1975

[54] VIRUS SEPARATION
[75] Inventors: Jerker Olof Porath; Jan-Christer Janson, both of Uppsala, Sweden
[73] Assignee: Exploaterings Aktiebolaget T.B.F., Uppsala, Sweden
[22] Filed: Dec. 11, 1973
[21] Appl. No.: 423,730

Related U.S. Application Data
[63] Continuation-in-part of Ser. No. 261,807, June 12, 1972, abandoned.

[30] Foreign Application Priority Data
June 18, 1971 Sweden............................. 7968/71

[52] U.S. Cl. ............................................... 195/1.5
[51] Int. Cl.$^2$........................................... C12K 7/00
[58] Field of Search..................................... 195/1.5

[56] References Cited
OTHER PUBLICATIONS
Jacoli–Chem. Abst., Vol. 69, (1968), p. 93992n.

Philipson–Chem. Abst., Vol. 76, (1972), p. 56162r.
Techniques in Experimental Virology, (Harris), 1964, pp. 68–69.

*Primary Examiner*—Sam Rosen
*Attorney, Agent, or Firm*—Young & Thompson

[57] ABSTRACT

The present invention relates to a method of separating a mixture of charged colloidal particles, e.g. virus variants by bringing the mixture to pass a bed of an adsorbent. The invention is mainly characterized in that the adsorbent is constituted of an insoluble, organic polymer containing amphoteric substituents composed of both basic nitrogen-containing groups and carboxylate or sulphonate groups. The proportion between the basic and the acid groups is simple and stoichiometric, whereby said charged particles are allowed to migrate at different speeds depending on the strength of the reciprocal interaction between the charged particles and the substituents in said adsorbent and are selectively adsorbed by said adsorbent.

1 Claim, No Drawings

VIRUS SEPARATION

This application is a continuation-in-part of copending application Ser. No. 261,807 filed June 12, 1972, and now abandoned.

It is previously known to fractionate polyelectrolytes by bringing a polyelectrolyte mixture to pass a bed of an amphoteric adsorbent.

It has now been shown that mixtures of charged colloidal particles can also be fractionated in a similar manner. Since the boundary between polyelectrolytes and colloidal particles is variable and cannot be defined in any exact way, it is clear that finer colloidal particles can be expected to react in the same way as polyelectrolytes in general. It is surprising, however, that coarser charged colloidal particles can likewise be fractionated by adsorption.

The invention relates to a method of separating a mixture of charged colloidal particles by bringing the mixture to pass a bed of an adsorbent, characterized in that the adsorbent is constituted of an insoluble, organic polymer containing amphoteric substituents composed of both basic, nitrogen-containing groups and carboxylate or sulphonate groups, so that the proportion between the basic and the acid groups is simple and stoichiometric. The charged particles are caused thereby to migrate at different speeds dependent on the strength of the reciprocal interaction between the charged particles and the substituents in the adsorbent, and are then selectively adsorbed by the adsorbent.

According to the invention the charged, colloidal particles are introduced into a bed of a cross-linked hydrophilic polymer material. The material's macroporous network is then penetrated by the particles which are adsorbed through the interaction with ampholyte ions homopolarly bound to the polymeric matrix. Appropriate amphoteric ions are, for example, substituents derived from amino acids with the general formula $$NH_2-(CH_2)_n-COOH$$

where $n$ is preferably between 1 and 6 inclusive, or α-amino acids with various side groups, for example, the amino acids occurring in hydrolyzed proteins.

The amphoteric substituent can consist of two ionogenic groups or ions with different types of charges and separated by an uncharged group of atoms. The amphoteric substituent can also contain a number of ionogenic groups with different charges in a numerical ratio other than 1, for example 1 acidic and 2 basic groups or vice versa, or some other simple numerical ratio. Examples of similar substituents are bound arginine and aspartic acid.

The macroporous network can consist of a hydroxy-containing polymer such as agar, agarose, dextran or cellulose in insoluble, preferably cross-linked form. It can also contain other hydrophilic groups.

Because of the dipolar character of the amphoteric ions an electric field is obtained in the area of the ion groups, which field then becomes more favorable for fractionating the charged particles than a field with conventional ion exchangers.

The dipolar or amphoteric adsorbent useful for the fractionation of a mixture of viruses can be prepared by a two-stage procedure, the first stage being activation and the second stage being coupling, as follows:

ACTIVATION 1 liter agarose gel suspension (preferably in bead form) is washed upon a filter with 5 liters of water and charged to a glass 2 liter reactor fitted with mechanical stirrer. The volume is adjusted to 1200 ml with water and the mixture is heated to 60° C. The reactor is then charged with 48.5 g sodium hydroxide and 0.6 g sodium borohydride, both dissolved in 60 ml water, followed by 180 g epichlorohydrin. The activation reaction is allowed to proceed at 60° C. for two hours with vigorous stirring. Finally, the activated agarose gel is washed upon a filter to neutrality with 5 liters of water.

COUPLING 1 liter activated agarose gel suspension is charged to a glass 2 liter reactor fitted with mechanical stirrer. The volume is adjusted to 1200 ml with water. 0.5 g sodium hydroxide and 0.3 g sodium borohydride in 10 ml water is then added, followed by 65 g arginine. The coupling reaction is allowed to proceed at 60° C. for two hours with vigorous stirring. Finally, the coupled product is washed upon a filter with 7 liters of water.

1 liter of coupled product is obtained, containing 3.2% nitrogen per gram dry adsorbent.

The invention will be illustrated in more detail in the form of an example.

1 ml of a preparation containing, in the same Tris-buffer, a mixture of two variants of Red Clover Mottle Virus, both with a diameter of 28 nm, is introduced after washing to equilibrium with 0.01 M Tris-HCl buffer, pH 7.5, in a 13 cm deep bed with a diameter of 1 cm consisting of 2% pearl type arginine agarose, prepared as above. Elution is carried out by continually increasing the ion strength from 0.01 M to 0.1 M. The eluate is collected in 1.5 ml fractions and the absorption at 280 nm is measured.

Analyzing UV-absorbing material four well defined zones, 1–4, were shown. The substances in each of these zones were examined under an electron microscope and examined serologically. The most quickly migrating zones, 1 and 2, were shown to contain various variants of one type of virus, while zones 3 and 4 contained another type of virus. Viruses from zone 4 differ from viruses from zone 3 in that they lack nucleic acid.

Corresponding trials were made with cross-linked diethyl amino ethyl agarose with the same degree of substitution and the same density in the gel matrix. Only three zones were obtained then, and furthermore the slowest migrating zone in this case was very wide and asymmetrical.

What is claimed is:

1. Method of separating a mixture of virus variants of substantially the same size by bringing the mixture in aqueous suspension to pass a bed of adsorbent, characterized in that the adsorbent is constituted of an insoluble, organic macroporous polymer selected from the group consisting of agar, agarose, dextran and cellulose, containing amphoteric substituents composed of both basic nitrogen-containing groups and carboxylate or sulphonate groups, where the proportion between the basic and the acid groups is simple and stoichiometric, whereby said viruses adsorb to said adsorbent, eluting said viruses in a plurality of elution steps with solutions of successively different ion strength, to thereby obtain virus variant separation and collecting the eluates in separate fractions.

* * * * *